(12) United States Patent
Cookson et al.

(10) Patent No.: US 7,167,876 B2
(45) Date of Patent: Jan. 23, 2007

(54) GENERALIZED CONFIGURATOR SOFTWARE SYSTEM

(76) Inventors: Ammon Cookson, 6971 NE. Willowgrove, Hillsboro, OR (US) 97124; David C. Florey, P.O. Box 1475, Sherwood, OR (US) 97140; Andre C Sublett, 2721 SE. 42 Ave., Hillsboro, OR (US) 97225; Jeffrey J. Kraus, 1025 Dollar St., West Linn, OR (US) 97068

(*) Notice: Subject to any disclaimer, the term of this patent is extended or adjusted under 35 U.S.C. 154(b) by 485 days.

(21) Appl. No.: 10/280,282

(22) Filed: Oct. 25, 2002

(65) Prior Publication Data

US 2004/0083239 A1    Apr. 29, 2004

(51) Int. Cl.
*G06F 17/30* (2006.01)
*G06F 7/00* (2006.01)

(52) U.S. Cl. .......................... 707/200; 707/3; 707/102

(58) Field of Classification Search .................. 707/3, 707/200, 102
See application file for complete search history.

(56) References Cited

U.S. PATENT DOCUMENTS 6,055,516 A * 4/2000 Johnson et al. ............... 705/27
6,128,600 A * 10/2000 Imamura et al. ............... 705/27
6,871,198 B2 * 3/2005 Neal et al. ...................... 707/3
6,915,306 B1 * 7/2005 Gong et al. ................. 707/102
6,928,441 B2 * 8/2005 Haegele .......................... 707/9

\* cited by examiner

*Primary Examiner*—Don Wong
*Assistant Examiner*—Thanh-Ha Dang
(74) *Attorney, Agent, or Firm*—Greenberg Traurig LLP (57) ABSTRACT

A generalized configurator software system provides separate building and executing of software-based configuration definitions from which any of a wide variety of articles may be specified or configured. For example, the configuration definitions may relate to various features or components that may be selected for or incorporated into or used to select or specify any type of article, including a personal computer, an automobile, a construction project (e.g., a bathroom remodel or a multistory structure), etc. The configuration definitions are stored in a definitions database and are built or constructed by a set-up user from a generalized configurator data structure or framework that may include any or all of variables, items, formulas, and assemblies. The variables, items, formulas, and assemblies are specified to represent the generic features or components that may be selected for one or more articles, and also include operating logic for selecting specific ones of the features or components. Accordingly, the configuration definitions define the basis on which a configuring user can select, specify, or "configure" any of one or more articles.

22 Claims, 4 Drawing Sheets

GENERALIZED CONFIGURATOR SOFTWARE SYSTEM

FIELD OF THE INVENTION

The present invention relates to configurator software systems by which configuring users can specify characteristics of an article and, in particular, to a generalized configurator software system that provides a framework for constructing configurators that are applicable to virtually any articles.

BACKGROUND AND SUMMARY OF THE INVENTION

Configurator software is used in a variety of contexts to configure a wide variety of articles for purposes of buying, building, selling, etc. One example of an application for configurator software is the consumer online retail purchasing of multi-feature articles such as personal computers. The following illustration is directed personal computers, but is similarly applicable to configurator operations relating to other types of articles.

Some online retailers of personal computers provide consumers with network access to configurator software to assist or guide the consumer in specifying the features and components of a computer to be purchased. The configurator software provides the consumer with feature and component choices and identifies the selections made. Upon completion of the purchase, the feature and component selections made by the consumer are used by the retailer to obtain from stock or assemble the computer as specified.

The configurator software has two functions: first to guide the configuring user (e.g., personal computer consumer) through the features and components that are available for an article, and second to pass the specified features and components (i.e., configuration) on for completion.

Configurator software can be of great utility for both the configuring users and the entities (e.g., businesses) that are providing articles that are specified by the users. A disadvantage of configurator software, however, is that it is typically very complex and difficult to create. In addition to basic user interface tools, a programmer typically creates dedicated software that specifies the features and components available for selection by the configuring user. The programmer typically must also create dedicated software for correlating the features and components available for selection by the configuring user with a database of actual articles and components. Due to these complexities and difficulties, conventional dedicated configurator software is expensive to create and expensive to maintain as article features and components change.

Accordingly, an aspect of the present invention is a generalized configurator software system that provides separate building and executing of software-based configuration definitions from which any of a wide variety of articles may be specified or configured. For example, the configuration definitions may relate to various features or components that may be selected for or incorporated into or used to select or specify any type of article, including a personal computer, an automobile, a construction project (e.g., a bathroom remodel or a multistory structure), etc.

The configuration definitions of the generalized configurator software system are stored in a definitions database and are built or constructed by a set-up user from a generalized configurator data structure or framework that may include any or all of variables, items, formulas, and assemblies. The variables, items, formulas, and assemblies are specified to represent the generic features or components that may be selected for one or more articles, and also include operating logic for selecting specific ones of the features or components. Accordingly, the configuration definitions define the basis on which a configuring user can select, specify, or "configure" any of one or more articles.

The configuration definitions form a generalized object repository that encompasses all possible characteristics, features, and components of the available articles, thereby providing a generic standardized representation of those articles. A logic engine executes logic associated with the configuration definitions to provide an article configurator for assisting a configuring user in selecting, specifying, or configuring an article. The logic engine obtains information (e.g., user inputs) from the configuring user and identifies specified generic properties of the article specified by the configuring user. The specified generic properties specified by the configuring user are then correlated with specific article properties stored in a component catalog database to identify one or more actual articles that meet, or most closely meet, the generic properties specified by the configuring user.

The present invention provides a generalized framework that can be adapted by a set-up user to specify or configure any type of article. In contrast, conventional configuration tools are built specifically for a particular application or type of article and fixedly relate the various features or components to be specified. A conventional configuration tool does not include a generalized framework that can be adapted by a set-up user to specify or configure any type of article. As a result, the generalized configurator software system of this invention can simplify and standardize the creation of configurator software, thereby reducing its cost and increasing its availability.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 1:
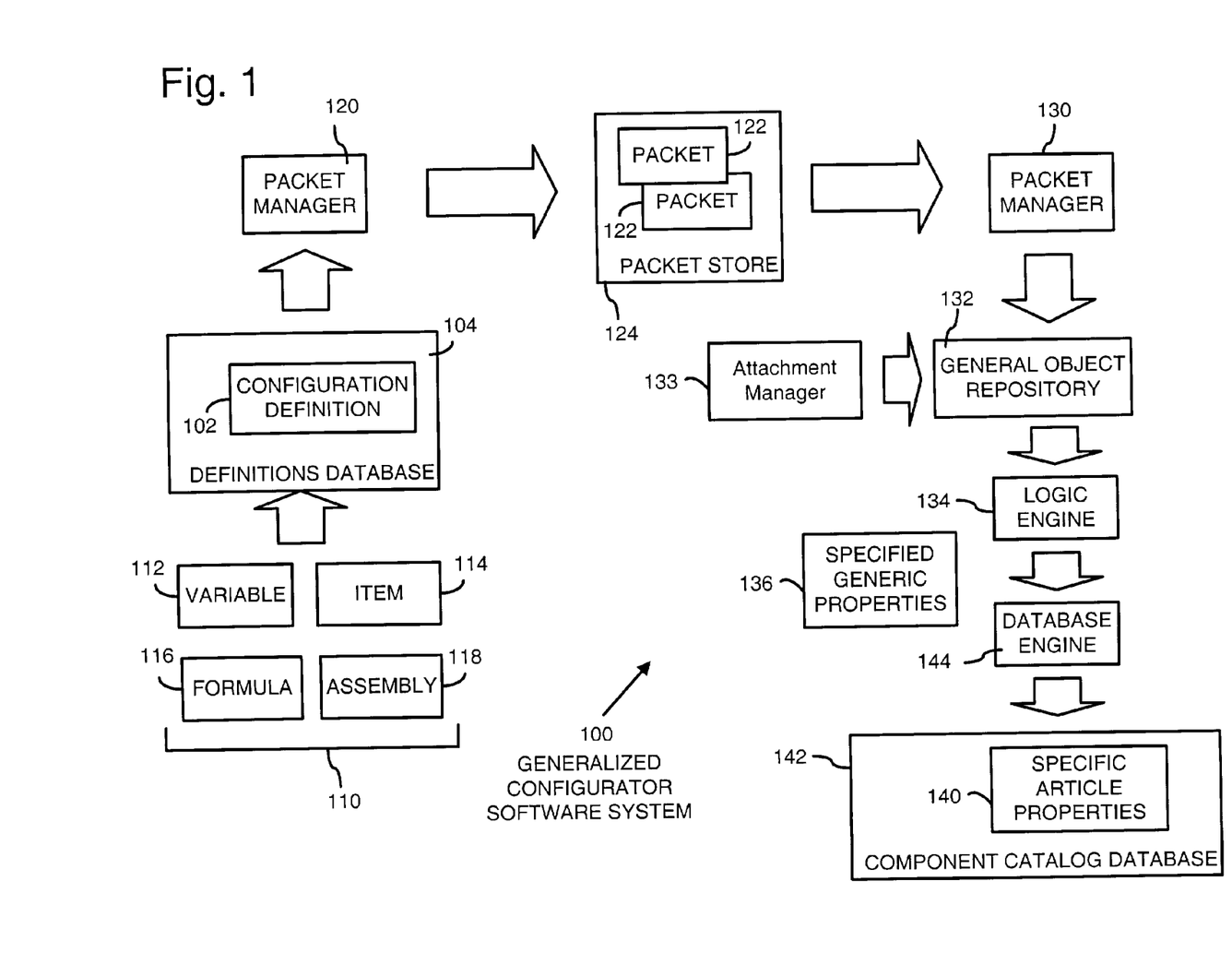
FIG. 1 is a functional block diagram illustrating a generalized configurator software system of the present invention.

FIG. 1 is a functional block diagram illustrating a generalized configurator software system 100 for separately building and executing software-based configuration definitions 102 (one shown) from which any of a wide variety of articles may be specified or configured. For example, the configuration definitions 102 may relate to various features or components that may be selected for or incorporated into or used to select or specify any type of article, including a personal computer, an automobile, a construction project (e.g., a bathroom remodel or a multistory structure), etc.

As described below in greater detail, the configuration definitions 102 of generalized configurator software system 100 are stored in a definitions database 104 and are built or constructed by a set-up user from a generalized configurator data structure or framework 110 that may include any or all of variables 112, items 114, formulas 116, and assemblies 118. Variables 112, items 114, formulas 116, and assemblies 118 in configuration definition 102 are specified to represent the generic features or components that may be selected for one or more articles, and also include operating logic for selecting specific ones of the features or components. Accordingly, configuration definition 102 defines the basis on which a configuring user can select, specify, or "configure" any of one or more articles. It will be appreciated that the set-up user who builds configuration definitions 102 would typically differ from the configuring user who uses the configuration definitions 102 to configure or specify an article.

As indicated above, a configuration definition 102 provides the basis on which a configuring user can select, specify, or configure any type of article, including a personal computer, an automobile, a construction project (e.g., a bathroom remodel or a multistory structure), etc. The configuring user may be, for example, an online customer specifying characteristics or features of a product, either for the purpose of having the product custom-made or for identifying a corresponding product within a catalog database. As another illustration, the configuring user may be a designer of a construction project (e.g., a multi-story building or a bathroom remodel) for which various features and components are to be specified or configured.

The variables 112, items 114, formulas 116, and assemblies 118 of generalized configurator software system 100 provide a generalized framework that can be adapted by a set-up user to specify or configure any type of article. In contrast, conventional configuration tools are built specifically for a particular application or type of article and fixedly relate the various features or components to be specified. A conventional configuration tool does not include a generalized framework that can be adapted by a set-up user to specify or configure any type of article.

As described below in greater detail, variables 112 represent a framework or data structure for identifying and accessing information (e.g., input) provided by a configuring user. Items 114 represent a framework or data structure for specific information relating to features or components of an article. Formulas 116 represent a framework or data structure for actions to be executed during interaction with a configuring user. Assemblies 118 represent a framework or data structure for correlating variables 112, items 114, formulas 116, and operating logic for configuring one or more particular articles.

Generalized configurator software system 100 includes a packet manager 120 that forms one or more assemblies 118, including related variables 112, items 114, formulas 116, and operating logic, into one or more self-contained encapsulations or packets 122 to facilitate network transmission and standardize accessing of assemblies 118. In one implementation, packets 102 are formatted as Extensible Mark-up Language (XML) documents, as described below in greater detail. Packet manager 120 provides creation, modification, deletion, and tracking of packets 122. Packet manager 120 also provides storage of packets 122 in a packet store 124 and retrieval therefrom. Packet store 124 may be included in or separate from definitions database 104.

Packets 122 allow set-up user to provide encapsulated configuration definitions 102 for particular types of articles based upon generalized framework 110. Packets 122 include all of the information and logic of one or more assemblies 118 corresponding to a type of article. To be used or accessed by a configuring user, the assembly or assemblies 118 and related variables 112, items 114, formulas 116, and operating logic of each packet 122 are extracted by a receiving packet manager 130 and stored in a general or generalized object repository 132. In one implementation, receiving packet manager 130 may be the same as generating packet manager 120, but reside on a different computer system. Packet managers 120 and 130 may be implemented as a set of encapsulated software objects (e.g., component object model, COM objects).

Generalized object repository 132 encompasses all possible characteristics, features, and components of the articles represented by the packets 122. Generalized object repository 132 provides, therefore, a generic standardized representation of those articles. In one implementation, generalized object repository 132 represents articles with a hierarchical characteristic structure that supports varying levels or degrees of characteristic specificity for each type of article that is represented. Attachments can be added to any data or database element and can be referenced via extended properties of the element or can be externally attached to general object repository 132 via an attachment manager 133.

Attachment manager 133 is a tool that is used to link attachments to specific database elements in generalized object repository 132. Such attachments may reside on local or network drives separately from the database structure of generalized object repository 132. Attachment manager 133 may include various user interface controls to allow a user to perform various functions, such as opening and closing a database, linking attachments to data or database elements in a database, viewing attachments, viewing attachment properties, and copying, editing, and pasting links between attachments and database elements.

A logic engine 134 executes logic included in each assembly 118 to provide an article configurator for assisting a configuring user in selecting, specifying, or configuring an article. Logic engine 134 interprets assembles 118, provides corresponding queries to the configuring user and obtains responses to the queries to identify features and components of the articles specified by the configuring user. Logic engine 134 obtains information (e.g., user inputs) from the configuring user and correlates the information with variables 112 and any related items 114 and formulas 116 to identify specified generic properties 136 of the article specified by the configuring user.

The specified generic properties 136 represent the component or feature characteristics that are specified by the configuring user. For example, the specified generic properties 136 for a personal computer could include processor type and speed, memory size, hard drive size, etc. As another example, the specified generic properties 136 for an article having features, rather than components, such as a toilet for a construction project could include color, water capacity, shape, etc.

The specified generic properties 136 specified by the configuring user are correlated with specific article properties 140 stored in a component catalog database 142 to identify one or more actual articles that meet, or most closely meet, the specified generic properties 136. Component catalog database 142 includes information about actual articles, such as those available for manufacturing a product or those available from a supplier such as a retailer. Accordingly, specific article properties 140 characterize the actual articles or products, including actual product numbers or other identifiers. A database engine 144 cooperates with logic engine 134 to generate a query (e.g., SQL query) to identify in component catalog database 142 actual articles with the user-defined characteristics or a closest match to them. Database engine 144 bases the database query on the specified generic properties 136.

An aspect of the present invention is that configuration definitions 102 for a particular type or class of articles would be compatible with a variety of component catalog databases 142, such as those used by different entities or businesses in an industry group. As a result, a common set of one or more configuration definitions 102 and the corresponding generalized object repository 132 can provide configurators for a variety of entities or businesses within an industry. These configurators would be compatible with the particular component catalog database 142 of each entity or business despite the proprietary variations in the different component catalog databases 142. For example, a single set of one or more configuration definitions 102 could be used by different personal computer manufacturers or sellers to configure personal computers.

Such generally applicable configuration definitions 102 allow different entities in an industry to operate configurators without each entity incurring the significant expense of creating its configurator "from scratch." In addition, the separation between these generally applicable configuration definitions 102 and the component catalog databases 142 of the different entities allow the entities to maintain and use their typically proprietary databases 142 with the generic configuration definitions.

As indicated above, packets 122 are self-contained encapsulations and in one implementation are formatted as XML documents. Table 1 below illustrates a structure for a packet 122 in the XML format. It will be appreciated, however, that packets 122 could include corresponding features and components in formats other than XML.

Each packet 122 includes a header, a travel log, and a collection of "changes" (e.g., updates, deletions, and new additions) by which the packet 122 represents or assembles an article. Table 1 below partly illustrates this structure with reference to a portion of an exemplary packet 122 that corresponds to an exemplary article (e.g., a stairway for an automobile parking structure). For purposes of illustration, details of the collection have been omitted. It ill be appreciated that this portion and article are merely illustrative and do not limit the applicability of the present invention to other applications.

TABLE 1

```
< Packet PacketGUID = "{89C65282-0906-4E F2-9D 1
F-73 E956DDDAC3}"
        CreationTime= "36798.7i29976851870000" DB Guid=
        "afef90a8=c3c8-42fb-9daS-d31017 leSb48" Origin =
        "DAVIDFS492"
        Creator= "DAVIDFL"Description='Text to describe the data~>
    <TravelLog>
        < Log Entry LogType = "CREATED" ModifiedTime=
        "36798.7129976851870000" Description = "Created" From=
        "DAVIDFL"
        />
    </TravelLog>
    <Variables CollectionType="0">
        < UPDATE Loader= "{84385F01-E 163=4454-BA8F-B91
        E9639 DOE6}" TableName = "Variable" >
        <Variable Oid="0" Name="# AG Stairs" Unit="ea"
            Note="Enter:Number of stair towers serving AG parking
            structure (typically 2 for footprintup to 20,000...3 for
            footprint to75,000...)"
            Default Value="2" MinValue="1"MaxValue="11"
            UseDefault="0" UseMin="0" UseMax="0" IsYesNo=
            "0" Value="0" IsConditional="0" IsActive="0" />
```

TABLE 1-continued

```
        <Variable Oid="0" Name=n# AG Sbirs" Unit="ea"
            Note="Enter:Number of stair towers serving AG parking
            structure (typically 2 for footprintup to 20,000...3 for
            footprint to75,000...)"
            DefaultValue="2" MinValue="2" MaxValue="11"
            UseDefault="0" UseMin="0" UseMax="0" IsYesNo=
            "0" Value="0" IsConditional="0" IsActive="0" />
    </UPDATE~
    < INSERT Loader=n{84385F01-E 163-4454-BA8F-B91 E9639D0 E6}"
    TableName="Variable">
        <Variable Oid="0" Name="# AG Sbirs" Unit=~ea"
            Note="Enter:Number of smir towers serving AG parking
            structure (typically 2 for footprintup to 20,000...3 for
            footprint to75,000...)"
            DefaultValue="2" MinValue="1" MaxValue="11"
            UseDefault="0" UseMin="0" UseMax="0" IsYesNo=
            "0" Value="0" IsConditonal="0" IsActive="0" />
    </INSERT>
    <DELETE Loader= "{84385F01-E 163-4454-BA8F-B9 IE9639D0 E6}"
    TableName= "Variable">
        <Variable Oid="0" Name="# AG Sbirs" Unit="ea"
            Note="Enter:Number of stair towers serving AG parking
            structure (typically 2 for footprintup to 20,000...3 for
            footprint to75,000...).
            DefaultValue="2" MinValue="1" MaxValue=~11.
            UseDefault="0" UseMin="0" UseMax="0" IsYesNo=
            "0"Value="0" IsConditional="0" IsActive="0" />
    </DELETE>
</Variables>
<Formulas CollectionType="0" />
<FormulaTables CollectionType="0" />
<Assemblies CollectionType="0" />
<Items CollectionType=~0" />
<ItemTables CollectionType="0" />
</Packet>
```

The header is identified by a tag (e.g., Packet Packet-GUID) and includes a globally-unique identifier (guid) that uniquely identifies the packet, information about when the packet was created, and a unique identifier of definitions database 104 with which the packet 122 is associated.

The travel log is identified by a tag (e.g., TravelLog) and represents a log or record detailing the history of the packet 122, including its creation, and optionally also including identifiers of other computer systems to which the packet 122 is sent, and identifiers of databases the packet 122 has updated. In this example, only creation information is included in the travel log.

Each of the variable tags in the update detail includes all of the information needed by logic engine 134 to update that variable based on interactions with the configuring user or the set-up user. The first tag in the update contains all of the old information, while a second tag contains new information. A variable tag within the INSERT tag details the information required to insert that variable. The DELETE tag includes information for deleting that variable from general object repository 132. A Loader attribute is included with each of the INSERT, UPDATE and DELETE tags. The Loader attribute identifies (e.g., by way of a class identifier CLSID) an object in logic engine 134 that can decode the packet 122 and perform an update on the general object repository 132.

The collection referred to as part of the general structure of packets 122 incorporates that relationships and interconnections between the components of an article. Generally, the collection represents articles with a hierarchical characteristic structure that supports varying levels or degrees of characteristic specificity for each type of article that is represented and may be characterized by related fields of information as follows:

```
group assembly
    assembly
        variable
        item tables
        items
        formula tables
        formulas
```

For example, a multi-component article may be characterized as an assembly, which may be characterized by variable, items (whether specified individually or from a table of items), and formulas (whether specified individually or from a table of formulas). Articles of increased complexity may be characterized as one or more group assemblies that each include one or more assemblies. This generalized hierarchical structure can represent articles having arbitrary complexity.

Figure 2:
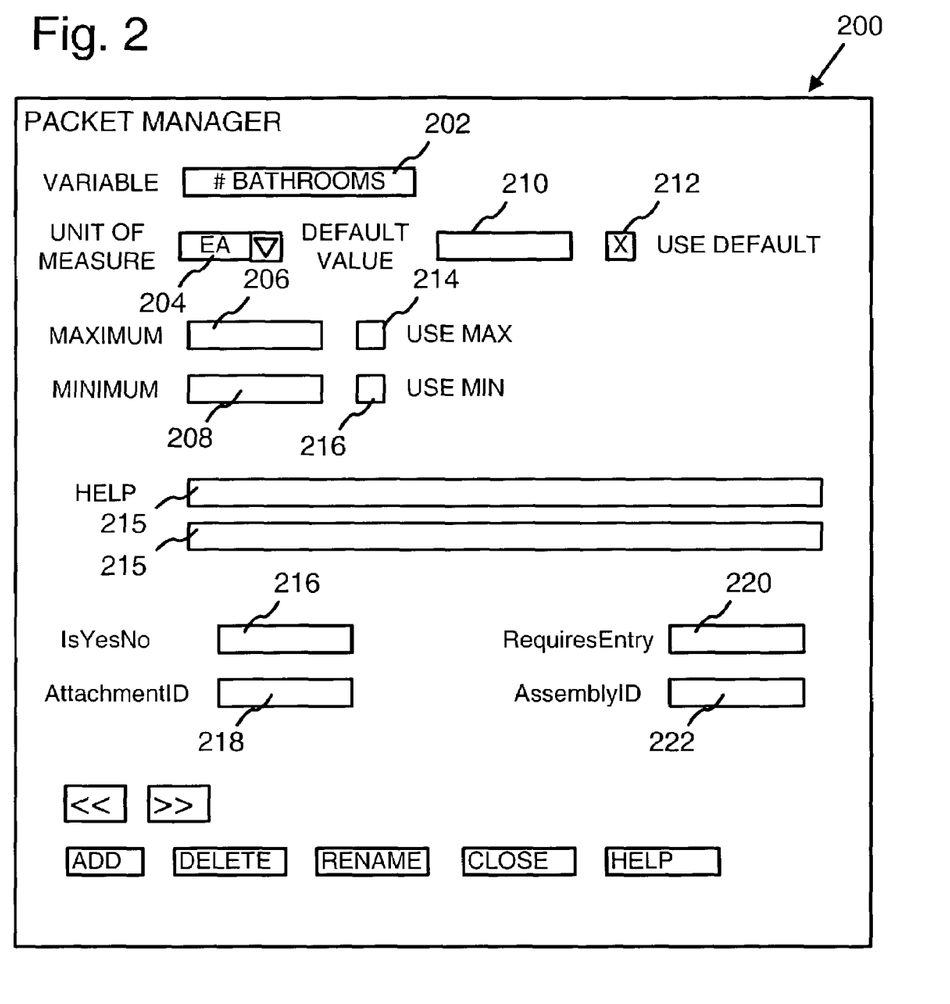
FIG. 2 is an illustration of a sample packet manager user interface display that could be rendered by a packet manager on a computer display screen.

FIG. 2 is an illustration of a sample packet manager user interface display 200 that could be rendered by packet manager 120 on a computer display screen to guide a configurator designer in specifying the attributes of a Variable in a particular packet 122. In an XML implementation, such a Variable may be characterized by the schema definition set forth in Table 2.

TABLE 2

| Column | Description |
| --- | --- |
| Oid | Unique object identifier |
| Name | Variable name from packet manager 120 |
| Unit | Unit of measure from packet manager 120 |
| Note | Variable help from packet manager 120 concatenated into one string |
| DefaultValue | Default variable value from packet manager 120 |
| UseDefault | T/F (true/false) flag whether to use the default value from packet manager 120 |
| MinValue | Minimum variable value from packet manager 120 |
| UseMin | T/F flag whether to use the minimum value from packet manager 120 |
| MaxValue | Maximum variable value from packet manager 120 |
| UseMax | T/F flag whether to use the maximum value from packet manager 120 |
| IsYesNo | T/F flag. indicating this is a Yes/No variable from packet manager 120 |
| AttachmentID | Object identifier to associated AttachmentHeader |
| RequiresEntry | Set when the default value is outside the min and max values |
| AssemblyID | If set, this is an assembly specific variable. This ID indicates which assembly |

This schema definition defines all details regarding a Variable, which may be more specifically referred to as a dimension variable, as further illustrated below.

Packet manager user interface display 200 includes various user interface (UI) fields that conform to the schema definition. In the illustrated example, a variable UI field 202 corresponds to the Name attribute of the schema definition. Likewise, unit, maximum, minimum, and default value UI boxes 204, 206, 208, and 210 correspond to respective schema definition attributes Unit, MaxValue, MinValue, and DefaultValue. Checkboxes 212–214 correspond to respective true/false (T/F) schema definition attributes UseDefault, UseMax, and UseMin. A Help Notes text box 215 corresponds to a Notes schema definition attribute, and UI boxes 216–222 correspond to respective schema definition attributes IsYesNo, AttachmentID, RequiresEntry, and AssemblyID.

Sample packet manager user interface display 200 illustrates with respect to a Variable how packet manager 120 can render user interface features corresponding to the schema definition attributes. Similar simplified user interfaces may be rendered for each part of a packet 122 being defined by a configurator designer, including portions of packets 102 representing group assembly, assembly, item tables, items, formula tables, and formulas, as well as other portions of a packet 122.

Figure 3A:
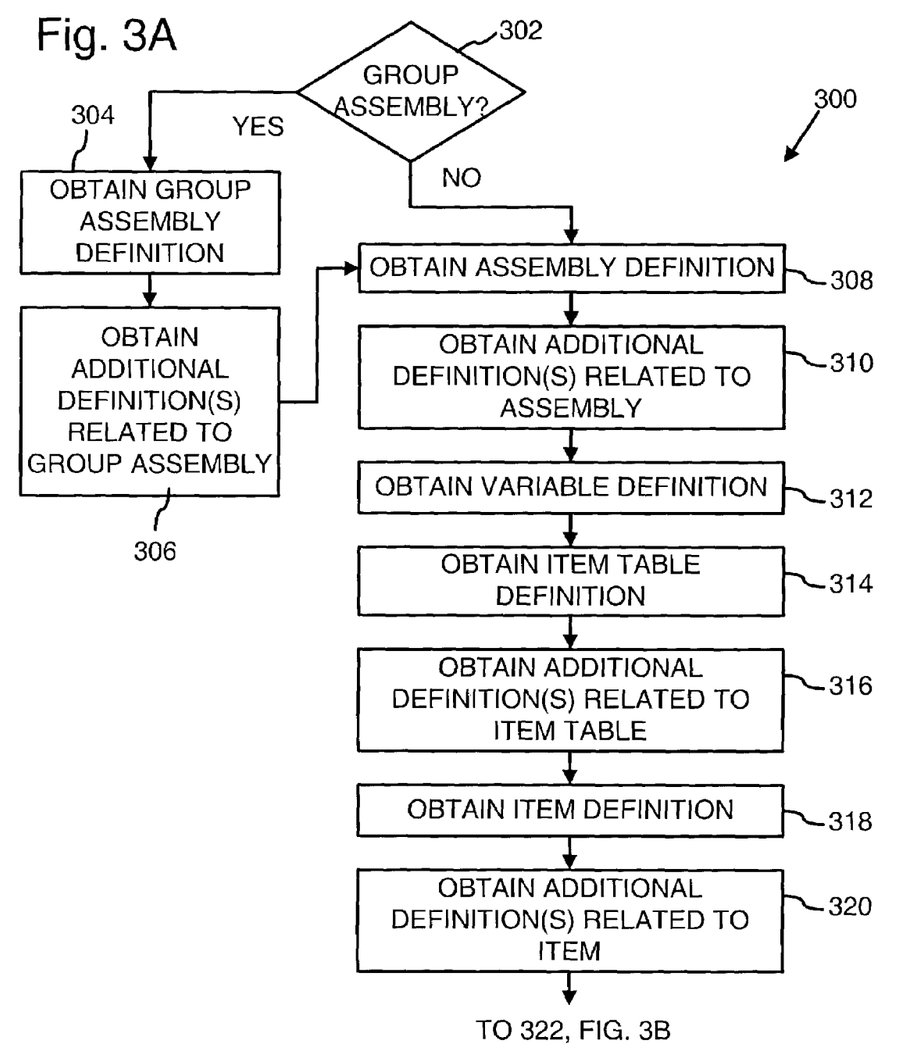
FIGS. 3A and 3B are a flow diagram of a packet creation method performed by the packet manager though interactions with a configurator designer.
Figure 3B:
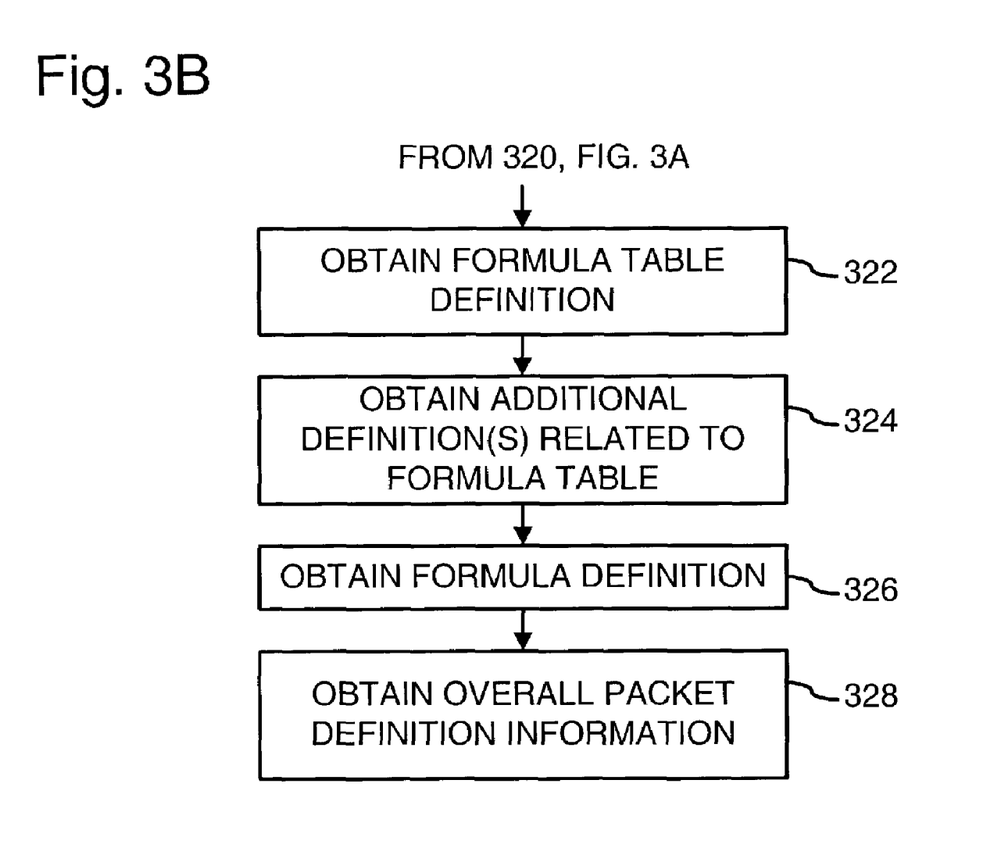

FIGS. 3A and 3B are a flow diagram of a packet creation method 300 performed by packet manager 120 though interactions with a configurator designer.

Inquiry block 302 represents an inquiry as to whether a group assembly is being defined. Inquiry block 302 proceeds to process block 304 if a group assembly is being defined and otherwise proceeds to process block 308.

Process block 304 indicates that a group assembly definition user interface is rendered for uniquely characterizing a set of related assemblies. The a group assembly definition user interface may include UI fields and boxes corresponding to schema definition attributes of a GroupAssembly schema described below. Process block 304 proceeds to process block 306.

Process block 306 indicates that one or more user interfaces relating to the group assembly definition may upon user selection be rendered for characterizing additional feature definitions related to the group assembly. These user interfaces may include UI fields and boxes corresponding to schema definition attributes of GroupPhase, AttachmentHeader, Attachmentitem, AttachmentOptions, AttachmentElement, AttachmentDetail, AttachmentCategoryOne, and AttachmentCategoryTwo schema described below. Attachments can be added to any data or database element and can be referenced via extended properties of the element or can be externally attached to general object repository 132 via attachment manager 133.

Process block 308 indicates an assembly definition user interface is rendered for uniquely characterizing an assembly. The assembly definition user interface may include UI fields and boxes corresponding to schema definition attributes of an Assembly schema described below.

Process block 310 indicates that one or more user interfaces relating to the assembly definition may upon user selection be rendered for characterizing additional feature definitions related to the group assembly. These user interfaces may include UI fields and boxes corresponding to schema definition attributes of AssemblyLine, AssemblySpecificVariable, AssemblyTakeoffData, and AssemblyVariable schema described below Process block 312 indicates a variable definition user interface is rendered for uniquely characterizing any variable relating to the assembly. The variable definition user interface may include UI fields and boxes corresponding to schema definition attributes of the Variable schema described above.

Process block 314 indicates an item table definition user interface is rendered for uniquely characterizing any table of items. The item table definition user interface may include UI fields and boxes corresponding to schema definition attributes of an ItemTable schema described below.

Process block 316 indicates that one or more user interfaces relating to the item table definition may upon user selection be rendered for characterizing additional feature definitions related to the item table. These user interfaces may include UI fields and boxes corresponding to schema definition attributes of ItemTableCell, ItemOid, and ItemTakeoffData schema described below Process block 318 indicates an item definition user interface is rendered for uniquely characterizing any item in the assembly. The item definition user interface may include UI fields and boxes corresponding to schema definition attributes of an Item schema described below.

Process block 320 indicates that one or more user interfaces relating to the item definition may upon user selection be rendered for characterizing additional feature definitions related to the Item. These user interfaces may include UI fields and boxes corresponding to schema definition attributes of ItemCategory, Itemindex, ItemProperty, ItemSubcategory, Phase, and Property schema described below Process block 322 indicates a formula table definition user interface is rendered for uniquely characterizing any formula table. The formula table definition user interface may include UI fields and boxes corresponding to schema definition attributes of a FormulaTable schema described below.

Process block 324 indicates that one or more user interfaces relating to the formula table definition may upon user selection be rendered for characterizing additional feature definitions related to the formula table. These user interfaces may include UI fields and boxes corresponding to schema definition attributes of a FormulaTableCell schema described below Process block 326 indicates a formula definition user interface is rendered for uniquely characterizing any formula used in the assembly. The formula definition user interface may include UI fields and boxes corresponding to schema definition attributes of a Formula schema described below.

Process block 328 indicates that one or more user interfaces relating to the overall packet definition may upon user selection be rendered for characterizing additional feature definitions related to the packet. These user interfaces may include UI fields and boxes corresponding to schema definition attributes of a DbInfo and Index schema described below. The index schema is handled on the fly when packets are applied to general object repository 132. Packets include information that relates to the source database and is stored in a DBInfo database table.

Listed below as Table 3 are exemplary schema definitions corresponding to an XML implementation of tags with which packets 102 may be defined.

TABLE 3

| Table | Assembly |
|---|---|
| Purpose | Uniquely identifies an assembly |
| Relationships | GroupAssembly and AttachmentHeader tables |
| Populated by | IPEDBAssembly for assembly specific info. AttachmentID is populated with attachment manager 133 the first time a user assigns an attachment to the specific assembly. |
| Business rules | Group assemblies and assemblies form a hierarchical relationship. |
| Integrity rules | Each assembly is removed when the GroupAssembly is deleted. Cascade delete associated AssemblyVariable, AssemblyLine, AssemblyTakeoffData, AssemblySpecificVariable, and Variable rows. |

| Column | Description |
|---|---|
| Oid | Unique object identifier |
| GroupID | Object identifier to associated GroupAssembly |
| Name | Assembly name from packet manager 120 |
| Description | Assembly description from packet manager 120 |
| Note | Assembly note from packet manager 120 |
| AttachmentID | Object identifier to associated AttachmentHeader |
| Calculation | User specified formula calculation from packet manager 120 |
| HasSpecificVariables | Indicates this assembly has assembly specific variables |
| Unit | Assembly unit from packet manager 120 |

TABLE 3-continued

| Table | AssemblyLine |
|---|---|
| Purpose | Detail instructions for generating takeoff with an assembly |
| Relationships | Ties to Assembly via AssemblyOid. LineTypeOid ties to a row in the Item table or the ItemTable table, depending on the LineType.CalcTypeOid ties to a row in the Formula table. |
| Populated by | IPEDBAssemblyLine(s) for a given IPEDBAssembly. The LineTypeOid is set based on the line type. It either represents a row in the Item table or the ItemTable table. The CalcTypeOid is set based on the calc type. It represents a row in the Formula table. |
| Business rules | AssemblyLines will change as more line types and calc types are added to the system. For now it is a fixed set as defined in IPEDBAssemblyLine documentation. |
| Integrity rules | When the assembly is removed, the associated AssemblyLine rows are removed. |

| Column | Description |
|---|---|
| Oid | Unique object identifier |
| AssemblyID | Object identifier to associated Assembly |
| LineType | Type of assembly line from packet manager 120 |
| LineTypeID | Object identifier to associated data element. The specific element depends on the LineType. |
| LineText | Object description or formula calculation, depending on the line type. |
| CalcType | Calculation code from packet manager 120 |
| CalcFactor | Calculation factor from packet manager 120 |
| Calculation | User specified formula calculation from packet manager 120 |
| CalcTypeID | depends on the CalcType. |

| Table | AssemblySpecificVariable |
|---|---|
| Purpose | Maps assemblies to assembly specific variables |
| Relationships | Ties to Assembly via AssemblyID. Ties to Variables via GenericVariableID and OverrideVariableID. Populated by packet manager while transferring assemblies. Assembly specific variable information comes from IPEDBAssembly. |
| Business rules | For each assembly, there can only be one override variable for a given generic variable. |
| Integrity rules | When an assembly is removed, the associated AssemblySpecificVariable rows are removed. When a generic variable is removed, the associated row in the AssemblySpecificVariable table is removed. |

| Column | Description |
|---|---|
| Oid | Unique object identifier |
| AssemblyID | Object identifier to associated Assembly |
| GenericVariableID | Object identifier to the variable that pets replaced. |
| OverrideVariableID | Object identifier to the assembly specific variable that replaces the generic variable |

| Table | AssemblyTakeoffData |
|---|---|
| Purpose | Pre-parsed assembly formula calculations. |
| Relationships | Ties to Assembly via AssemblyId. |
| Populated by | Formula engine when assemblies are transferred from packet manager 120 to packet engine 110 |
| Business rules | Once generated, this data remains constant. If the assembly changes, this data is replaced with new data. |
| Integrity rules | When the assembly is removed, the associated AssemblyTakeoffData row is removed. |

TABLE 3-continued

| Column | Description |
| --- | --- |
| AssemblyID | Object identifier to associated Assembly |
| InitVariableData | Holds the pre-parsed assembly formula calculations |

| | |
| --- | --- |
| Table | AssemblyVariable |
| Purpose | Maps assemblies to variables |
| Relationships | Assembly, Variable, and AttachmentHeader tables |
| Populated by | Creating a row for every variable in iPEDBAssembly. AttachmentID is populated with attachment manager 133 the first time a user assigns an attachment to the specific AssemblyVariable. |
| Business rules | Quantity variable is automatically created and doesn't require a row in this table. |
| Integrity rules | When the assembly is removed, the associated AssemblyVariable rows are removed. |

| Column | Description |
| --- | --- |
| Oid | Unique object identifier |
| AssemblyID | Object identifier to associated Assembly |
| VariableID | Object identifier to associated Variable |
| AttachmentID | Object identifier to associated AttachmentHeader |

| | |
| --- | --- |
| Table | AttachmentCategoryOne |
| Purpose | Holds list of User-defined names for category one |
| Relationships | None |
| Populated by dialog. | User edits the table through attachment manager 133 options |
| Business rules | None |
| Integrity rules | None |

| Column | Description |
| --- | --- |
| Oid | Unique object identifier |
| Name | User defined category name |

| | |
| --- | --- |
| Table | AttachmentCategoryTwo |
| Purpose | Holds list of user-define names for category two |
| Relationships | None |
| Populated by dialog. | User edits the table through attachment manager 133 options |
| Business rules | None |
| Integrity rules | None |

| Column | Description |
| --- | --- |
| Oid | Unique object identifier |
| Name | User defined category name |

| | |
| --- | --- |
| Table | AttachmentDetail |
| Purpose | Maps attachments to a single attachment header |
| Relationships | AttachmentHeaderID ties to the AttachmentHeader table. AttachmentitemID ties to the Attachmentitem table. CategoryOneID ties to the CategoryOne table. CategoryTwoID ties to the CategoryTwo table. |
| Populated by | A row is added to this table for each attachment assigned to a data element in attachment manager 133. |
| Business rules | AttachmentHeader and AttachmentDetail form a hierarchical relationship. |
| Integrity rules | Each AttachmentDetail is deleted when the associated AttachmentHeader is deleted. |

TABLE 3-continued

| Column | Description |
| --- | --- |
| AttachmentHeaderID | Object identifier to associated AttachmentHeader |
| AttachmentitemID | Object identifier to associated Attachmentitem |
| CategoryOneID | Object identifier to associated AttachmentCategoryOne |
| Cate,qoryTwoID | Object identifier to associated AttachmentCategoryTwo |
| Note | User defined note |

| | |
| --- | --- |
| Table | AttachmentElement |
| Purpose | List of catalog data elements we can assign attachments. |
| Relationships | None. |
| Populated by | attachment manager 133 when it first opens a database. |
| Business rules | None. |
| Integrity rules | The data remains for the life of the database. |

| Column | Description |
| --- | --- |
| Oid | Unique object identifier |
| Name | Unique data element name assigned by attachment manager 133 |

| | |
| --- | --- |
| Table | AttachmentHeader |
| Purpose | Maps a set of attachments to a single data element. |
| Relationships | There is a one-to-one relationship between the AttachmentHeader and the data element table via OwnerID. |
| Populated by | For most data elements, the first time an attachment is assigned to a data element in GAM, an AttachmentHeader is created. For Variables, an AttachmentHeader row is created for each Variable row. This is done so Item/AssemblyTakeoffData generation will have the appropriate links. |
| Business rules | A row in the AttachmentHeader can only be assigned to a single data element. |
| Integrity rules | Cascade delete all AttachmentDetail records when the AttachmentHeader is deleted. The AttachmentHeader is deleted when the data element is deleted. |

| Column | Description |
| --- | --- |
| Oid | Unique object identifier |
| AttachmentElementID | Object identifier to associated AttachmentElement |
| OwnerID | Object identifier to associated data element |

| | |
| --- | --- |
| Table | AttachmentItem |
| Purpose | Holds all details about a single attachment |
| Relationships | None |
| Populated by | A row is added to this table for each unique attachment assigned to a data element in GAM. |
| Business rules | None |
| Integrity rules | A separate process in GAM is run to scan the database and remove attachments no longer used. |

| Column | Description |
| --- | --- |
| Oid | Unique object identifier |
| SourceFile | Source path to the attachment file. |
| FileName | The file name and extension for the attachment. |
| Source | For future usage |
| Author | For future usage |

TABLE 3-continued

| Table | AttachmentOptions |
|---|---|
| Purpose | Holds the attachment options specified by the user through attachment manager 133. |
| Relationships | None |
| Populated by | attachment manager 133 Options dialog |
| Business rules | The default category records pointed to by DefaultCategoryOne/TwoID must exist. |
| Integrity rules | None |

| Column | Description |
|---|---|
| RelativePath | Hold a path name from which all other attachments can be found. This shortcut helps Users create a structure for storing attachments that can be simply modified in the future. |
| ModemSpeed | Modem speed specified by the user for doing estimated download |
| ExplorerFile | Path and file name of program to launch when the Explorer option is selected in attachment manager 133 |
| CategoryOneHeadinq | User defined description of category one |
| CategoryTwoHeadinq | User defined description of category two |
| DefaultCategoryOneID | Object identifier to associated AttachmentCategoryOne row used as the default value when assigning attachments. |
| DefaultCategoryTwoID | Object identifier to associated AttachmentCategoryTwo row used as the default value when assigning attachments |

| Table | DBInfo |
|---|---|
| Purpose | Store database information |
| Relationships | None |
| Populated by | CatalogDataServices - InitDataSource. |
| Business rules | Only one record in the table. |
| Integrity rules | None. |

| Column | Description |
|---|---|
| Oid | Unique object identifier |
| Name | Name of the Database |
| GUID | A unique identifier for the database |
| SourceID | An identifier of a source database if the database was transferred in |
| Note | Any notes for the database |
| Version | Database version |

| Table | Formula |
|---|---|
| Purpose | Uniquely identify every formula and hold the raw formatted text. |
| Relationships | None |
| Populated by | IPEFormula |
| Business rules | Formulas are encoded strings that are parsed and understood by the formula engine. |
| Integrity rules | Formulas are dropped when the table is dropped. |

| Column | Description |
|---|---|
| Oid | Unique object identifier |
| Name | Formula name from packet manager 120 |
| FormulaText | Actual formula in text format from packet manager 120 |

| Table | FormulaTable |
|---|---|
| Purpose | Represents a table of formulas |
| Relationships | none |
| Populated by | IPEFormulaTable |
| Business rules | None |
| Integrity rules | FormulaTable rows are dropped when the table is dropped. Cascade delete associated FormulaTableCells. |

| Column | Description |
|---|---|
| Oid | Unique object identifier |
| Name | Formula table name from packet manager 120 |
| RowSelector | Formula calculation for determining a row in the table |
| ColumnSelector | Formula calculation for determining a column in the table |

| Table | FormulaTableCell |
|---|---|
| Purpose | Represents a single cell in a formula table |
| Relationships | Ties back to a FormulaTable |
| Populated by | The cells of IPEFormulaTable. If the Calculation is a numeric value, it is assigned to CalcValue to avoid translation at run time. |
| Business rules | The calculation is an encoded string that is parsed and understood by the formula engine. |
| Integrity rules | Cells are removed when the associated FormulaTable is removed. |

| Column | Description |
|---|---|
| Oid | Unique object identifier |
| FormulaTableID | Object identifier to associated FormulaTable |
| TableRow | Value representing a row in the FormulaTable |
| TableColumn | Value representing a column in the FormulaTable |
| Calculation | User specified formula calculation from the packet manager 120 formula table |
| CalcValue | User specified value from the packet manager 120 formula table |

| Table | GroupAssembly |
|---|---|
| Purpose | Uniquely identifies a set of related assemblies. |
| Relationships | AttachmentHeader table |
| Populated by | IPEDBGroupAssembly for group assembly specific info. AttachmentID is populated with attachment manager 133 the first time a user assigns an attachment to the specific GroupAssembly. |
| Business rules | Group assemblies and assemblies form a hierarchical relationship. |
| Integrity rules | Cascade delete associated Assemblies. Delete the associated AttachmentHeader. |

| Column | Description |
|---|---|
| Oid | Unique object identifier |
| Name | Group assembly name from packet manager 120 |
| Description | Group assembly description from packet manager 120 |
| Note | Group assembly note from packet manager 120 |
| AttachmentID | Object identifier to associated AttachmentHeader |

| Table | GroupPhase |
|---|---|
| Purpose | Uniquely identifies a set of related phases and items. |
| Relationships | AttachmentHeader table |
| Populated by | IPEDBGroupPhase for group phase specific info. AttachmentID is populated with attachment manager 133 the first time a user assigns an attachment to the specific GroupPhase. |
| Business rules | Group phases, phases, and items form a hierarchical relationship. |
| Integrity rules | Cascade delete associated phases. Delete the associated AttachmentHeader. |

TABLE 3-continued

| Column | Description |
| --- | --- |
| Oid | Unique object identifier |
| Name | Group phase name from packet manager 120 |
| Description | Group phase description from packet manager 120 |
| Note | Group phase note from packet manager 120 |
| AttachmentID | Object identifier to associated AttachmentHeader |

| Table | Index |
| --- | --- |
| Purpose | Names of the indexes used to lookup data in an external system. Each index is user defined and represents some unique way to access NSSD data. |
| Relationships | None |
| Populated by | Market Maker |
| Business rules | None |
| Integrity rules | Index rows are dropped when the table is dropped. |

| Column | Description |
| --- | --- |
| Oid | Unique object identifier |
| Name | User defined name for the index |

| Table | Item |
| --- | --- |
| Purpose | Uniquely identifies a Database Item |
| Relationships | Phase and AttachmentHeader tables. |
| Populated by | IPEDBItem for item specific info. AttachmentID is populated with attachment manager 133 the first time a user assigns an attachment to the specific item. |
| Business rules | GroupPhases, Phases, and Items form a hierarchical relationship. |
| Integrity rules | Each Item is removed when the Phase is deleted. |

| Column | Description |
| --- | --- |
| Oid | Unique object identifier |
| PhaseID | Object identifier to associated Phase |
| Name | Item name from packet manager 120 |
| Description | Item description from packet manager 120 |
| Note | Item note from packet manager 120 |
| AttachmentID | Object identifier to associated AttachmentHeader |
| Calculation | User specified formula calculation from packet manager 120 |
| Takeoff Unit | Item takeoff unit from packet manager 120 |
| Waste Factor | Item waste factor from packet manager 120 |

| Table | ItemCategory |
| --- | --- |
| Purpose | Holds category information from packet manager 120 for a specific item |
| Relationships | Item and ItemSubcategory tables. |
| Populated by | IPEDBCategory for category specific info. ItemSubcategoryID is populated with the transfer tool by finding the appropriate ID or creating a new ItemSubcategory record. |
| Business rules | Items and ItemCategory form a hierarchical relationship. There is a many to many relationship between Items and ItemSubcategories. |
| Integrity rules | Each ItemCategory is removed when the Item is deleted. |

| Column | Description |
| --- | --- |
| Oid | Unique object identifier |
| ItemID | Object identifier to associated Item |
| Type | Type of category (labor, material, sub, equip, other) |
| Use Waste | Flag indicating we need to calculate waste |
| OrderUnit | Order unit can be different than the takeoff unit |
| Price | Order unit price for this category |
| ConversionType | Specifies how we convert takeoff unit to order unit (multiply or divide). |
| RoundType | Specifies how to round the conversions (up, down, closest, none) |
| IsTaxable | Flag indicating this category can be taxed. |
| PriceLink | Link to other ItemCategories so changes to this price can be applied to other ItemCategories. |
| ItemSubcategoryID | Object identifier to associated ItemSubcategory |
| RoundValue | Value to round the category from packet manager 120 |
| ConversionFactor | Value for doing conversion between item takeoff unit and the category order unit. This value comes from packet manager 120. |

| Table | ItemIndex |
| --- | --- |
| Purpose | Maps items to Index's, providing customized integration with NSSD. |
| Relationships | Item and Index tables. |
| Populated by | Market Maker by specifying specific index values for specific items. |
| Business rules | An ItemIndex row will exist for every assigned ItemIndex value. |
| Integrity rules | Itemindex row is removed when the associated Item or Index is removed. |

| Column | Description |
| --- | --- |
| Oid | Unique object identifier |
| ItemID | Object identifier to associated item |
| IndexID | Object identifier to associated index |
| Value | Text value of this ItemIndex. It can be data, stored procedure, XML, or anything else the user defines |

| Table | ItemProperty |
| --- | --- |
| Purpose | Maps Items to Property rows, providing extended attributes/properties for the items. |
| Relationships | Item and Properly tables. |
| Populated by | Market Maker by specifying specific property values for specific items. |
| Business rules | An ItemProperty row will exist for every assigned ItemPropety valUe. |
| Integrity rules | ItemProperly row is removed when the associated Item or Property is removed. |

| Column | Description |
| --- | --- |
| Oid | Unique object identifier |
| ItemID | Object identifier to associated Item |
| PropertyID | Object identifier to associated Property |
| Value | Text value of this ItemProperty. It can represent any data the User defines. |
| Unit | Allows a User to specify a packet manager 120 unit value for this properly. |

TABLE 3-continued

| Table | ItemSubcategory |
|---|---|
| Purpose | Holds Subcategory information from packet manager 120. |
| Relationships | None |
| Populated by | IPEDBSubcategory. |
| Business rules | None |
| Integrity rules | ItemSubcategory's are dropped when the table is dropped. |

| Column | Description |
|---|---|
| Oid | Unique object identifier |
| Description | Subcategory description from packet manager 120 |
| Unit | Unit of measure from packet manager 120 |

| Table | ItemTable |
|---|---|
| Purpose | Represents a table of items |
| Relationships | none |
| Populated by | IPEItemTable |
| Business rules | None |
| Integrity rules | ItemTable rows are dropped when the table is dropped. Cascade delete associated ItemTableCells. |

| Column | Description |
|---|---|
| Oid | Unique object identifier |
| Name | Item table name from packet manager 120 |
| RowSelector | Formula calculation for determining a row in the table |
| ColumnSelector | Formula calculation for determining a column in the table |

| Table | ItemTableCell |
|---|---|
| Purpose | Represents a single cell in an item table |
| Relationships | ItemTable via ItemTableOid. Ties to a row in the Item table via ItemOid |
| Populated by | IPEItemTable |
| Business rules | The calculation is an encoded string that is parsed and understood by the formula engine |
| Integrity rules | Cells are removed when the associated ItemTable is removed. |

| Column | Description |
|---|---|
| Oid | Unique object identifier |
| ItemTableID | Object identifier to associated ItemTable |
| TableRow | Value representing a row in the ItemTable |
| TableColumn | Value representing a column in the ItemTable |
| Calculation | User specified formula calculation from the packet manager 120 item table |
| ItemID | Object identifier to associated Item that this cell may represent |

| Table | ItemTakeoffData |
|---|---|
| Purpose | Preparsed item formula calculations. |
| Relationships | Ties to Item via ItemID. |
| Populated by | Formula engine where items are transferred from packet manager 120 to packet engine 110 |
| Business rules | Once generated, this data remains constant. If the item changes, this data is replaced with new data. |
| Integrity rules | When the item is removed, the associated ItemTakeoffData row is removed. |

| Column | Description |
|---|---|
| ItemID | Object identifier to associate4 Item |
| InitVariableData | Holds the pre-parsed assembly formula calculations |

| Table | ItemVariable |
|---|---|
| Purpose | Maps items to variables |
| Relationships | Item, Variable, and Attachment tables |
| Populated by | Creating a row for every variable in iPEDBItem. AttachmentID is populated with attachment manager 133 the first time a user assigns an attachment to the specific ItemVariable. |
| Business rules | Quantity variable is automatically created and doesn't require a row in this table. |
| Integrity rules | When the item is removed, the associated ItemVariable rows are removed. |

| Column | Description |
|---|---|
| Oid | Unique object identifier |
| ItemID | Object identifier to associated Item |
| VariableID | Object identifier to associated Variable |
| AttachmentID | Object identifier to associated AttachmentHeader |

| Table | Phase |
|---|---|
| Purpose | Uniquely identifies a set of related items. |
| Relationships | GroupPhase and AttachmentHeader tables |
| Populated by | IPEDBPhase for phase specific info. AttachmentID is populated with attachment manager 133 the first time a user assigns an attachment to the specific Phase. |
| Business rules | Group phases, phases, and items form a hierarchical relationship. |
| Integrity rules | Cascade delete associated items. Delete the associated AttachmentHeader via the AttachmentID. |

| Column | Description |
|---|---|
| Oid | Unique object identifier |
| GroupID | Object identifier to associated GroupPhase |
| Name | Phase name from packet manager 120 |
| Description | Phase description from packet manager 120 |
| Note | Phase note from packet manager 120 |
| AttachmentID | Object identifier to associated AttachmentHeader |

| Table | Property |
|---|---|
| Purpose | Stores the names of extended properties that users can create and assign to items. |
| Relationships | None |
| Populated by | Market Maker |
| Business rules | None |
| Integrity rules | Property rows are dropped when the table is dropped. |

| Column | Description |
|---|---|
| Oid | Unique object identifier |
| Name | User defined name for the property |
| PropType | Used to store a definition of the property value data type (ex: string, double, int, etc.). |

| Table | Variable |
|---|---|
| Purpose | Holds all details about a dimension variable |
| Relationships | Note and AttachmentHeader tables |
| Populated by | IPEVariableDefinition |
| Business rules | Assembly specific variables are part of this table with their own Oid. A variable is assembly specific when AssemblyID is not 0. |
| Integrity rules | Assembly specific variables are removed when the assembly is removed. All other variables are dropped when the table is dropped or deleted through packet manager. |

TABLE 3-continued

| Column | Description |
| --- | --- |
| Oid | Unique object identifier |
| Name | Variable name from packet manager 120 |
| Unit | Unit of measure from packet manager 120 |
| Note | Variable help from packet manager 120 concatenated into one string |
| DefalutValue | Default variable value from packet manager 120 |
| UseDefault | T/F flag whether to use the default value from packet manager 120 |
| MinValue | Minimum variable value from packet manager 120 |
| UseMin | T/F flag whether to use the minimum value from packet manager 120 |
| MaxValue | Maximum variable value from packet manager 120 |
| UseMax | T/F flag whether to use the maximum value from packet manager 120 |
| IsYesNo | T/F flag. indicating this is a Yes/No variable from packet manager 120 |
| AttachmentID | Object identifier to associated AttachmentHeader |
| RequiresEntry | Set when the default value is outside the min and max values |
| AssemblyID | If set, this is an assembly specific variable. This ID indicates which assembly |

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. A computer-readable storage medium encoded with computer instructions and software components to configure an article of manufacture, the software components comprising:
   1) at least one configuration definition that generically defines an assembly article having at least one component, the at least one configuration definition including:
      a) at least one item data structure that identifies a corresponding component of the assembly article;
      b) at least one variable data structure that stores input information from a configuring user;
      c) at least one formula to automatically calculate configuration information based on the input information stored in the at least one variable data structure;
      d) operating logic that permits the calculation of the at least one formula in relation to the at least one corresponding component of the assembly article, wherein the operating logic prompts the configuring user for the input information, and wherein the operating logic further renders generic properties from the configuration information;
   2) a logic engine that executes the operating logic included in the at least one configuration definition to assist a configuring user to configure a specific assembly having generic properties;
   3) a component catalog database that stores component information and corresponding specific component properties; and
   4) a database engine that generates a query of the component catalog database based upon generic properties of the specific assembly specified by the configuring user, thereby identifying in the component catalog database at least one component having specific component properties that match to the generic properties of the specific assembly.

2. The computer-readable storage medium of claim 1, wherein at least one variable data structure further stores configuration information calculated from the formulas.

3. The computer-readable storage medium of claim 1, wherein the at least one configuration definition resides in a configuration definition database.

4. The computer-readable storage medium of claim 1, further comprising a packet manager that forms the at least one configuration definitions into encapsulated packets for transmission over a computer network and for extracting the at least one configuration definitions from the encapsulated packets after transmission over a computer network.

5. The computer-readable storage medium of claim 1, wherein the encapsulated packets are in the form of extensible mark-up language (XML) documents.

6. The computer-readable storage medium of claim 1, wherein the variable data structure is part of an assembly data structure.

7. The computer-readable storage medium of claim 1, wherein the item data structure is part of an assembly data structure.

8. The computer-readable storage medium of claim 1, wherein the formula data structure is part of an assembly data structure.

9. The computer-readable storage medium of claim 1, wherein the variable data structure, the item data structure, and the formula data structure are part of an assembly data structure.

10. A computer-implemented method to configure an article of manufacture, comprising:
   1) generating at least one configuration definition that generically defines an assembly article having at least one component, the at least one configuration definition including:
      a) at least one item data structure that identifies a corresponding component of the assembly article;
      b) at least one variable data structure that stores input information from a configuring user;
      c) at least one formula to automatically calculate configuration information based on the input information stored in the at least one variable data structure;
      d) operating logic that permits the calculation of the at least one formula in relation to the at least one corresponding component of the assembly article, wherein the operating logic prompts the configuring user for the input information, and wherein the operating logic further renders generic properties from the configuration information;
   2) executing the operating logic included in the at least one configuration definition at a logic engine, the operating logic being executed to assist a configuring user to configure a specific assembly having generic properties;

3) storing component information and corresponding specific component properties in a component catalog database; and 4) generating a query of the component catalog database based upon generic properties of the specific assembly specified by the configuring user, thereby identifying in the component catalog database at least one component having specific component properties that match the generic properties of the specific assembly.

11. The computer-implemented method of claim 10, wherein at least one variable data structure further stores configuration information calculated from the formulas.

12. The computer-implemented method of claim 10, wherein the at least one configuration definition resides in a configuration definition database.

13. The computer-implemented method of claim 10, further comprising a packet manager that forms the at least one configuration definitions into encapsulated packets for transmission over a computer network and for extracting the at least one configuration definitions from the encapsulated packets after transmission over a computer network.

14. The computer-implemented method of claim 10, wherein the encapsulated packets are in the form of extensible mark-up language (XML) documents.

15. The computer-implemented method of claim 10, wherein the variable data structure is part of an assembly data structure.

16. The computer-implemented method of claim 10, wherein the item data structure is part of an assembly data structure.

17. The computer-implemented method of claim 10, wherein the formula data structure is part of an assembly data structure.

18. The computer-implemented method of claim 10, wherein the variable data structure, the item data structure, and the formula data structure are part of an assembly data structure.

19. A computer-implemented system to configure an article of manufacture, comprising:
1) a processor;
2) at least one configuration definition that generically defines an assembly article having at least one component, the at least one configuration definition including:
   a) at least one item data structure that identifies a corresponding component of the assembly article;
   b) at least one variable data structure that stores input information from a configuring user;
   c) at least one formula to automatically calculate configuration information based on the input information stored in the at least one variable data structure;
   d) operating logic that permits the calculation of the at least one formula in relation to the at least one corresponding component of the assembly article, wherein the operating logic prompts the configuring user for the input information, and wherein the operating logic further renders generic properties from the configuration information;
3) a logic engine that executes the operating logic included in the at least one configuration definition to assist a configuring user to configure a specific assembly having generic properties;
4) a component catalog database that stores component information and corresponding specific component properties; and
5) a database engine that generates a query of the component catalog database based upon generic properties of the specific assembly specified by the configuring user, thereby identifying in the component catalog database at least one component having specific component properties that match the generic properties of the specific assembly.

20. The computer-implemented system of claim 19, wherein the at least one configuration definition resides in a configuration definition database.

21. The computer-implemented system of claim 19, further comprising a packet manager that forms the at least one configuration definitions into encapsulated packets for transmission over a computer network and for extracting the at least one configuration definitions from the encapsulated packets after transmission over a computer network.

22. The computer-implemented system of claim 19, wherein the variable data structure, the item data structure, and the formula data structure are part of an assembly data structure.

* * * * *